US006101555A

United States Patent
Goshey et al.

[11] Patent Number: 6,101,555
[45] Date of Patent: Aug. 8, 2000

[54] METHODS AND APPARATUS FOR COMMUNICATING BETWEEN NETWORKED PERIPHERAL DEVICES

[75] Inventors: Michael Goshey, San Jose; Maureen McMahon, Sunnyvale, both of Calif.

[73] Assignee: Adaptec, Inc., Milpitas, Calif.

[21] Appl. No.: 09/005,792

[22] Filed: Jan. 12, 1998

[51] Int. Cl.[7] .................................................. G06F 9/00
[52] U.S. Cl. ........................ 709/301; 709/212; 709/216; 709/217; 709/219; 709/300; 710/100
[58] Field of Search ................................... 709/212, 216, 709/217, 219, 301, 300; 710/100; 395/200.42, 200.46, 200.47, 200.49, 681, 280, 680

[56] References Cited

U.S. PATENT DOCUMENTS

| | | | |
|---|---|---|---|
| 5,237,693 | 8/1993 | Kiyohara et al. | 709/229 |
| 5,317,693 | 5/1994 | Cuened et al. | 710/9 |
| 5,325,527 | 6/1994 | Cwikowski et al. | 395/650 |
| 5,548,724 | 8/1996 | Akizawa et al. | 395/200.03 |
| 5,598,538 | 1/1997 | Cooper | 710/101 |
| 5,659,794 | 8/1997 | Caldarale et al. | 395/821 |
| 5,687,320 | 11/1997 | Wiley et al. | 709/245 |
| 5,790,809 | 8/1998 | Holmes | 709/228 |
| 5,832,298 | 11/1998 | Sanchez et al. | 710/8 |
| 5,862,404 | 1/1999 | Onaga | 709/223 |
| 5,870,562 | 2/1999 | Butman | 709/238 |
| 5,901,286 | 5/1999 | Danknick et al. | 709/203 |
| 5,950,203 | 9/1999 | Stakuis et al. | 707/10 |

*Primary Examiner*—Zarni Maung
*Assistant Examiner*—Saleh Najjar
*Attorney, Agent, or Firm*—Martine Penilla & Kim, LLP

[57] ABSTRACT

Disclosed is a method and apparatus for establishing communication to a remote peripheral device over a network. The method includes issuing a request to use a peripheral device to a remote communications dynamically linked list, and determining whether the peripheral device is a local peripheral device or a remote peripheral device. The method further includes sending the request over a network to a remote computer that has a server application when the peripheral device is the remote peripheral device. The server application is configured to enable sharing of peripheral devices that are connected to the remote computer. Preferably, the system registry of the computer making the request is altered to enable efficient communication with the remote peripheral device.

26 Claims, 13 Drawing Sheets

METHODS AND APPARATUS FOR COMMUNICATING BETWEEN NETWORKED PERIPHERAL DEVICES

CROSS REFERENCE TO RELATED APPLICATIONS

This application is related to U.S. application Ser. No. 09/005,799, filed on the same day as the instant application, and entitled "Method And Apparatus For Sharing Peripheral Devices Over A Network." This application is hereby incorporated by reference.

BACKGROUND OF THE INVENTION

1. Field of the Invention

This invention relates generally to computer peripheral devices, and more particularly to methods and apparatus for sharing peripheral devices connected to one networked computer with other networked computers.

2. Description of the Related Art

Recently, computer users have enjoyed substantial flexibility in the way their computers are equipped. This flexibility is primarily due to the increased use of peripheral devices, which allow computer users to purchase only those hardware devices that make sense for their particular work requirements. In fact, the variety of available peripheral devices is ever increasing, which necessarily requires that they be well integrated with the computer's existing software. Although most peripheral device manufactures are able to provide excellent software drivers that enable the full functionality of the peripheral devices when they are connected to a local computer, other networked computers are not always able to fully access or utilize the peripheral devices connected to other computers on a shared network.

FIG. 1 is a network diagram 10 having a number of computers 12a through 12d coupled together via a file server 14. In this configuration, each of the computers may communicate with each other, as well as share and use information stored on the file server 14. Conventionally, each of the computers may have a host adapter that enables the computer to connect up to external peripheral devices. As shown, computer 12a has a host adapter 16a which is used to connect up to peripheral devices, such as a hard drive 22, and a JAZ™ drive 24. Generally, the host adapter 16a is in the form of an adapter card (or PCMCIA card for portable computers) that connects to the computer 12a via a PCI bus or the like.

Similarly, computer 12b has a host adapter 16b which enables computer 12b to communicate to a scanner 18 and an optical drive 20. Although these peripheral devices enable computers 12a and 12b to have extended use and functionality, these peripheral devices are generally not fully accessible to other computers that are connected to the network over the file server 14. For example, even though computers 12c and 12d may conventionally acquire some rudimentary read and write privileges to peripheral devices 20, 22, and 24, they are still not able to issue full standard SCSI commands to those peripheral devices.

Furthermore, neither computer 12a, 12c, nor 12d may gain access or functional use of the scanner 18 that is connected to the computer 12b. This is generally the case because many peripheral devices are not assigned drive letters during boot-up. Such devices generally include scanners, tape drives, CD-R drives, and other SCSI based peripheral devices. As a result, those peripheral devices may not be fully shared over a network of computers, which may necessitate the purchase of a redundant peripheral device (i.e., a scanner) for each local computer system.

Unfortunately, this will drive up the cost of a given network, and may be unsuitable for smaller businesses or home offices where low cost networking solutions are most needed. To partially alleviate this problem, some computer peripheral companies have introduced a solution that enables sharing of such peripheral devices over a network when additional custom hardware circuitry and software is provided. For example, Hewlett-Packard of Palo Alto, Calif., has a hardware solution that requires users to purchase a network box 26 having special hardware to assist in communicating with a host adapter 16c. The network box 26 is then connected to a scanner 28 that is custom designed to interface with a network box 26. In some cases, the network box 26 circuitry may be integrated directly into the scanner 28.

Once the scanner 28 has been connected to the file server 14 via the host adapter 16c, the scanner 28 may be shared by other computers that are networked through the file server 14. Although this sharing solution works well in some high-end networks, the cost of sharing peripheral devices, such as scanner 28 over a network may be prohibitively expensive compared to the cost of a conventional peripheral device. Consequently, the scanner 28 and network box 26 solution may not be cost effective for use in smaller networked arrangements or home office use.

In view of the foregoing, there is a need for a method and apparatus that enables networked computers to access peripheral devices that are connected to any one of the respective network computers, without the need for expensive interfacing hardware or custom peripheral devices.

SUMMARY OF THE INVENTION

Broadly speaking, the present invention fills these needs by providing a method and apparatus for communicating with and using peripheral devices that are connected to a computer that is remotely networked. It should be appreciated that the present invention can be implemented in numerous ways, including as a process, an apparatus, a system, a device, a method, or a computer readable medium. Several inventive embodiments of the present invention are described below.

In one embodiment, a method for establishing communication to a remote peripheral device over a network is disclosed. The method includes issuing a request to use a peripheral device to a remote communications dynamically linked list, and determining whether the peripheral device is a local peripheral device or a remote peripheral device. The method further includes sending the request over a network to a remote computer that has a server application when the peripheral device is the remote peripheral device. The server application is configured to enable sharing of peripheral devices that are connected to the remote computer.

In another embodiment, an apparatus for communicating with remote peripheral devices that are networked to a local computer is disclosed. The apparatus includes a system registry having a modified path. The apparatus further includes a local communication dynamic linked list that is configured to initially communicate with a remote communication dynamic linked list when the system registry has the modified path. The remote dynamic linked list communicates with a remote host adapter when a request is for a remote peripheral device, and communicates back to the local communication dynamic linked list for communication with a local host adapter when the request is for a local peripheral device.

In yet a further embodiment, a system for establishing communication to a remote peripheral device over a network is disclosed. The system includes means for issuing a request to use a peripheral device to a remote communications dynamically linked list, and means for determining whether the peripheral device is a local peripheral device or a remote peripheral device. The system further includes means for sending the request over a network to a remote computer that has a server application when the peripheral device is the remote peripheral device. The server application is configured to enable sharing of peripheral devices that are connected to the remote computer.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for communicating with and using peripheral devices that are connected to a computer that is remotely networked. It will be obvious, however, to one skilled in the art, that the present invention may be practiced without some or all of these specific details. In other instances, well known process operations have not been described in detail in order not to unnecessarily obscure the present invention.

Figure 1:
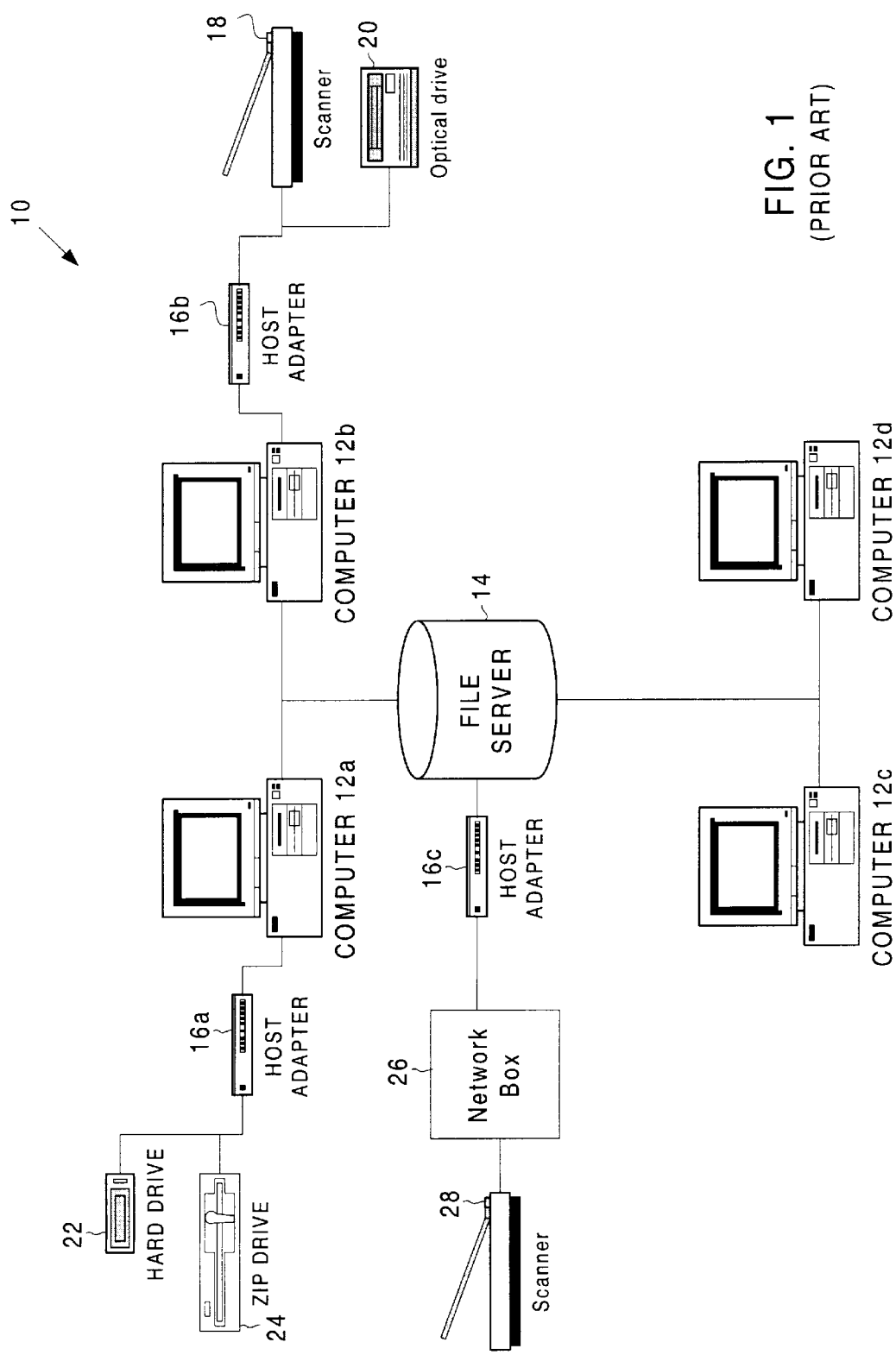
FIG. 1 is a network diagram that has a number of computers networked together.
Figure 2A:
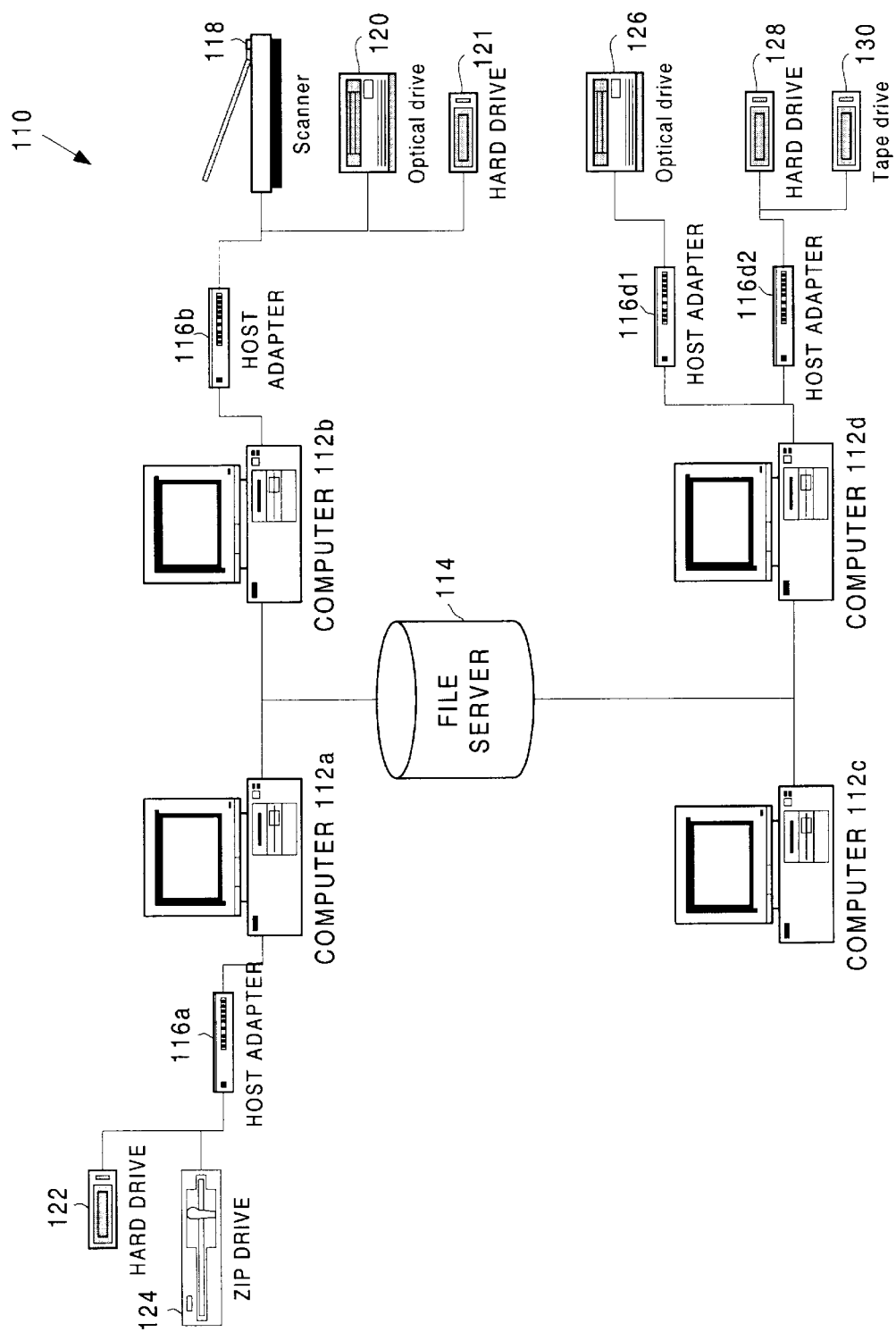
FIG. 2A shows a network diagram in accordance with one embodiment of the present invention.

FIG. 2A shows a network diagram 110 in accordance with one embodiment of the present invention. In this example, computers 112a through 112d are networked via a file server 114. In addition, several of the computers have host adapters 116 which enable interconnection to external peripheral devices. As shown, computer 112a is connected to a hard drive 122 and a JAZ™ drive 124 via a host adapter 116a. Computer 112b is connected to a scanner 118, an optical drive 120, and a hard drive 121 via a host adapter 116b. Computer 112d is connected to an optical drive 126 via a host adapter 116d1, and a hard drive 128, and a tape drive 130 via a host adapter 116d2.

In this example, computer 112c is not shown having an adapter for interconnecting external peripheral devices. In one embodiment, when a user of computer 112d wishes to verify which external peripheral devices it has access to, the user may perform a scan of host adapters and peripheral devices using a SCSI Explorer program, that is available from Adaptec, Inc. of Milpitas, Calif.

Figure 2B:
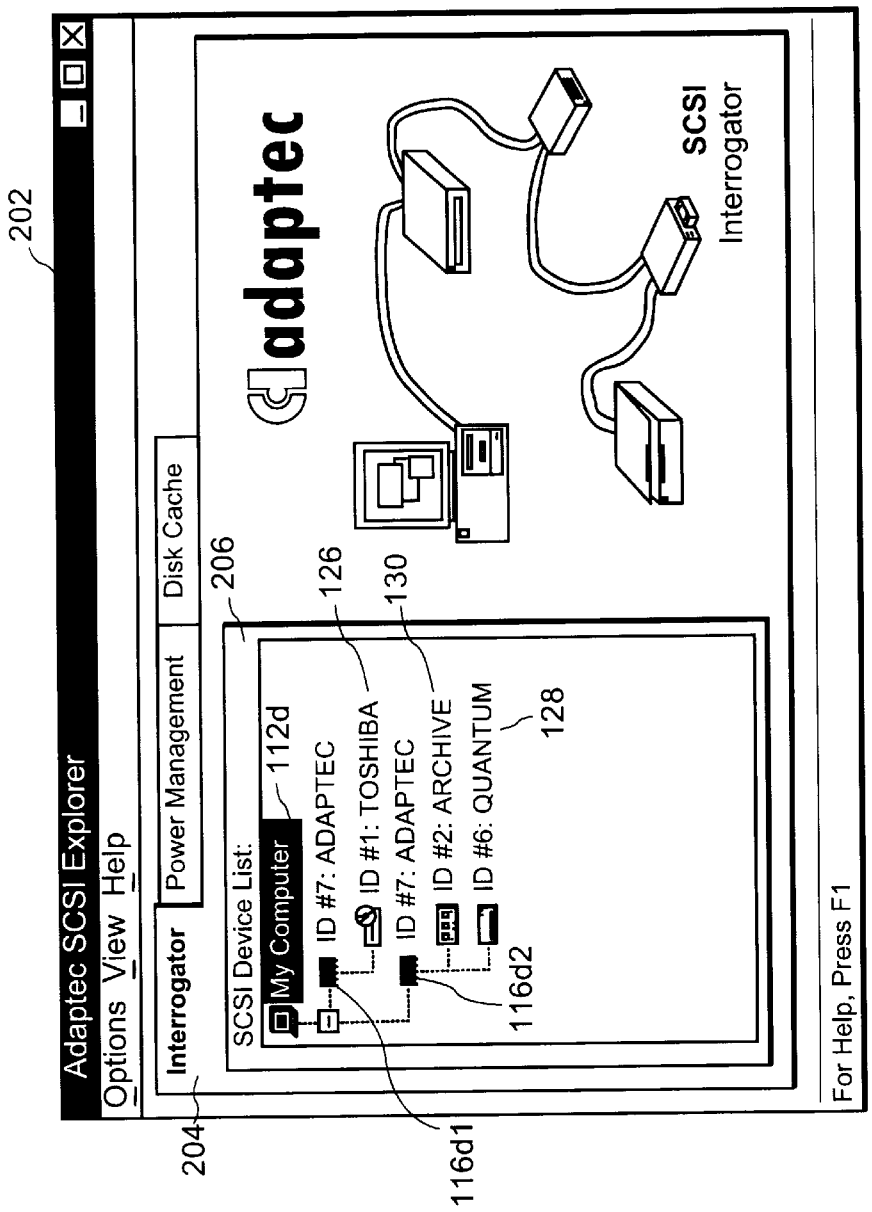
FIG. 2B shows a SCSI Explorer™ window that has an interrogator option in accordance with one embodiment of the present invention.

FIG. 2B shows a SCSI Explorer™ Window 202 that has an interrogator 204 option. When the interrogator 204 option is run, a list of available devices that are actually connected to computer 112d are shown in a window 206. Specifically, a SCSI device list in tree format is displayed identifying any devices that are accessible and connected to computer 112d of FIG. 2A. In this example, computer 112d is shown having a host adapter 116d1 and a host adapter 116d2, which respectively have the peripheral devices illustrated in FIG. 2A.

As shown, the SCSI Explorer™ Window 202 is not able to see or access any of the peripheral devices that are connected to the other computers that are networked via the file server 114 of FIG. 2A. Consequently, the user of computer 112d may not have full SCSI command access to the peripheral devices of either computer 112a or computer 112b. In one embodiment of the present invention, when a Server/Client (S/C) ScanLAN code is loaded onto any one of the computers that are networked in FIG. 2A, the code will enable a user of any one of those computers to see and access via full SCSI commands, peripheral devices on other computers. However, the access level may be restricted based on custom privilege settings, which will be described in greater detail below.

Figure 2C:
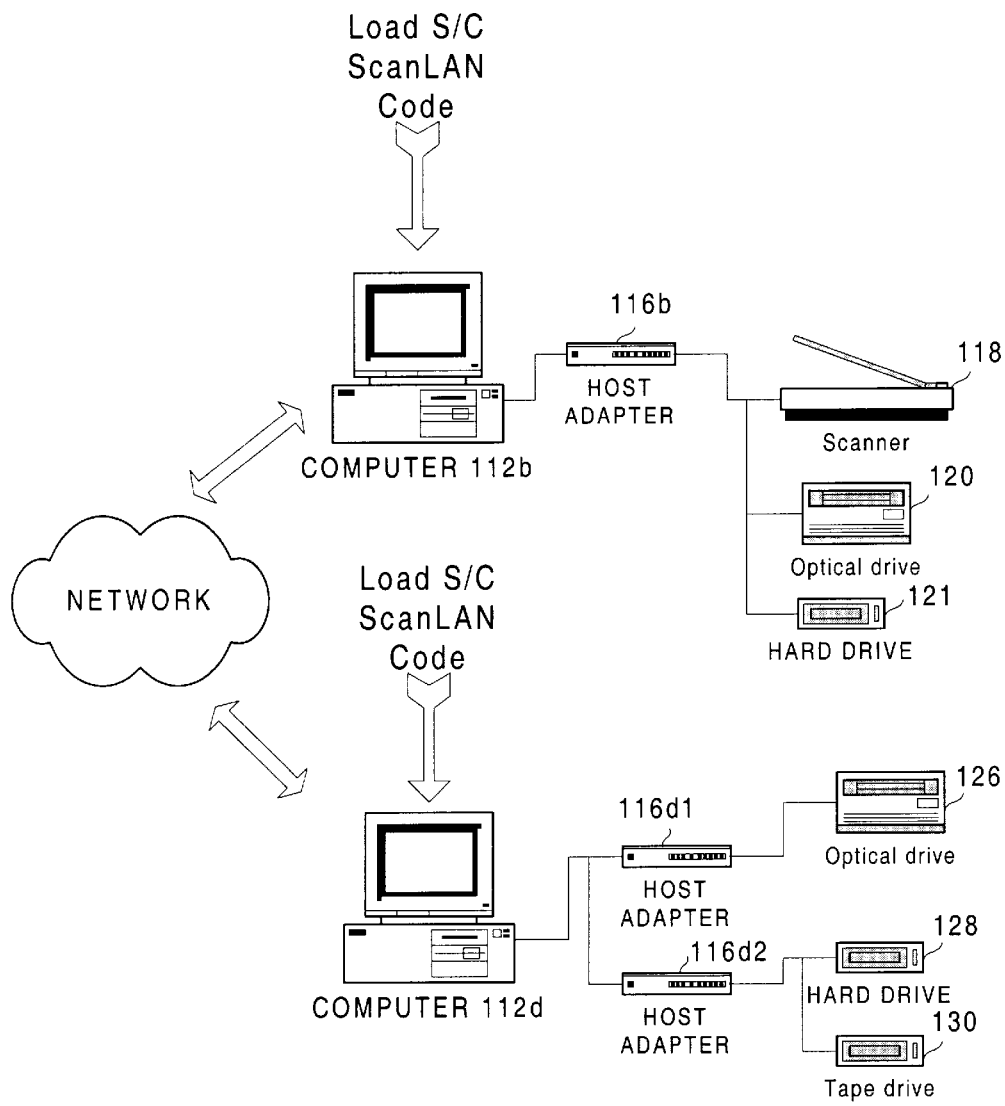
FIG. 2C shows a partial diagram of FIG. 2A, in which a Server/Client ScanLAN code is loaded onto computers in accordance with one embodiment of the present invention.

FIG. 2C shows a partial diagram of FIG. 2A in which the S/C ScanLAN code is loaded onto computer 112b and computer 112d in accordance with one embodiment of the present invention. In this embodiment, computers 112b and 112d may be any computer that is connected to a network (local area network, wide area network or Internet). In addition, the S/C ScanLAN code may be manually loaded onto each computer from a computer readable medium (i.e., diskettes, CD ROM, etc.) or remotely loaded onto selected computers over an administration network computer. Once the S/C ScanLAN code has been loaded onto individual computers, users of a selected networked computer will then be able to access the peripheral devices connected to other network computers as if the peripheral devices were connected to their local computer. As mentioned above, the access to selected peripheral devices of a given network may be custom modified to grant or deny use privileges.

By way of example, if the Server (S) ScanLAN code is loaded onto computer 112b, and the Client (C) ScanLAN code is loaded onto computer 112d, then the user of computer 112d may be granted access privileges to the peripheral devices connected to computer 112b (which runs as a Server). Alternatively, each one of computers 112b and 112d may be loaded with both the Server and the Client ScanLAN code, which will therefore enable other users connected to the network to access the peripheral devices connected to both computer 112b and computer 112d, when they are running as a Server.

A particular advantage of the present invention is that no additional hardware is needed to enable a user of a local computer to fully access the peripheral devices connected to other computers connected to the network. In fact, a user of a local computer may issue SCSI commands to networked peripheral devices that would normally only work for peripheral devices that were connected to the local computer. As such, the user may now access devices, such as scanners, tape drives, CD-R drives, and other SCSI devices that are typically not assigned a drive letter, without the need for expensive hardware or expensive custom peripheral devices.

Figure 2D:
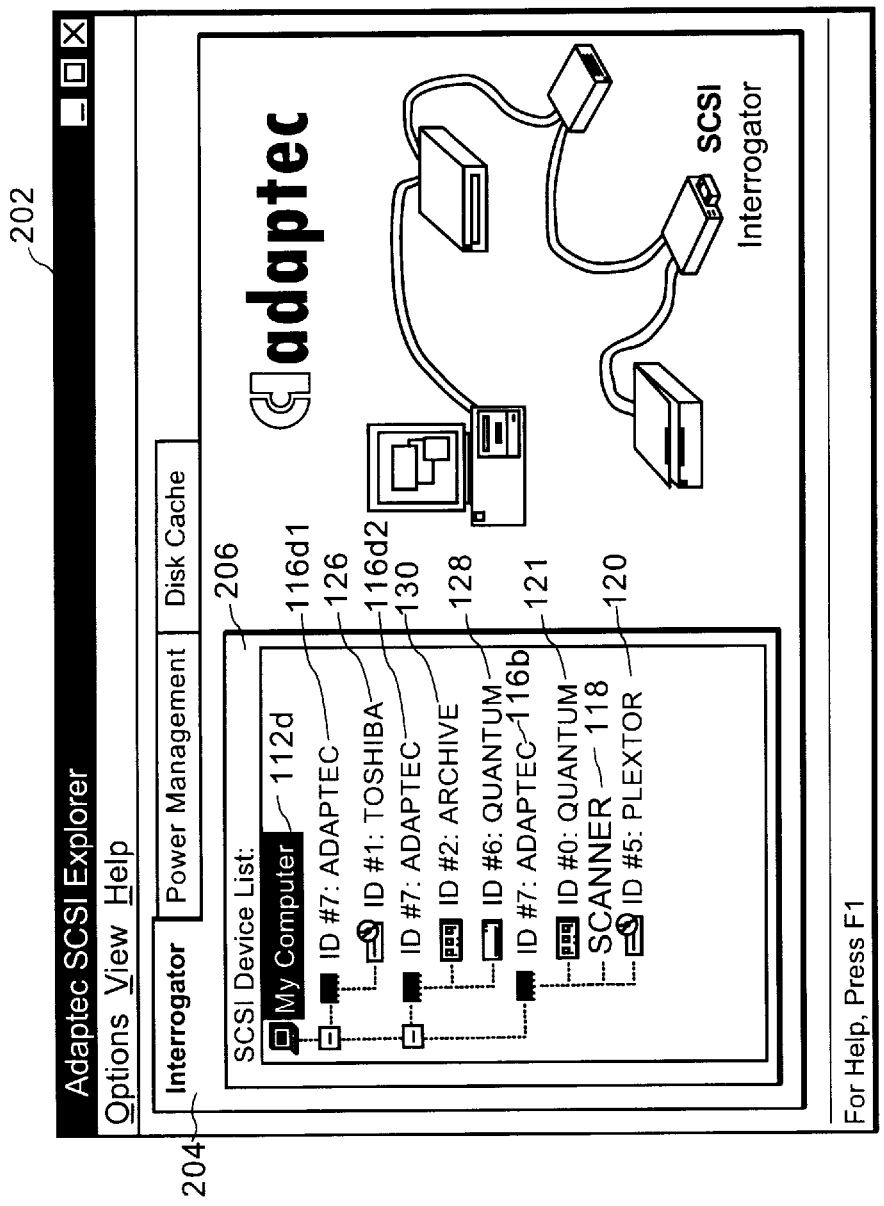
FIG. 2D shows the SCSI Explorer™ window after the ScanLAN code has been loaded onto some of the computers of FIG. 2A in accordance with one embodiment of the present invention.

FIG. 2D shows the SCSI Explorer™ 202 window after the ScanLAN code has been loaded onto at least computers 112b and 112d of FIG. 2C in accordance with one embodiment of the present invention. As shown, the SCSI device list 206 is now expanded to include host adapter 116b (and peripheral devices 118, 120 and 121), which is physically connected to the computer 112b. Accordingly, when a user of the computer 112d uses the interrogator 204 to determine what peripheral devices and host adapters are connected to computer 112d, the SCSI device list 206 will also include the peripheral devices that are connected to computer 112b, as if they were physically connected to computer 112d. Advantageously, the user of computer 112d may now access and issue SCSI commands to those peripheral devices that are connected to the host adapter 112b as if they were connected to computer 112d.

Figure 3A:
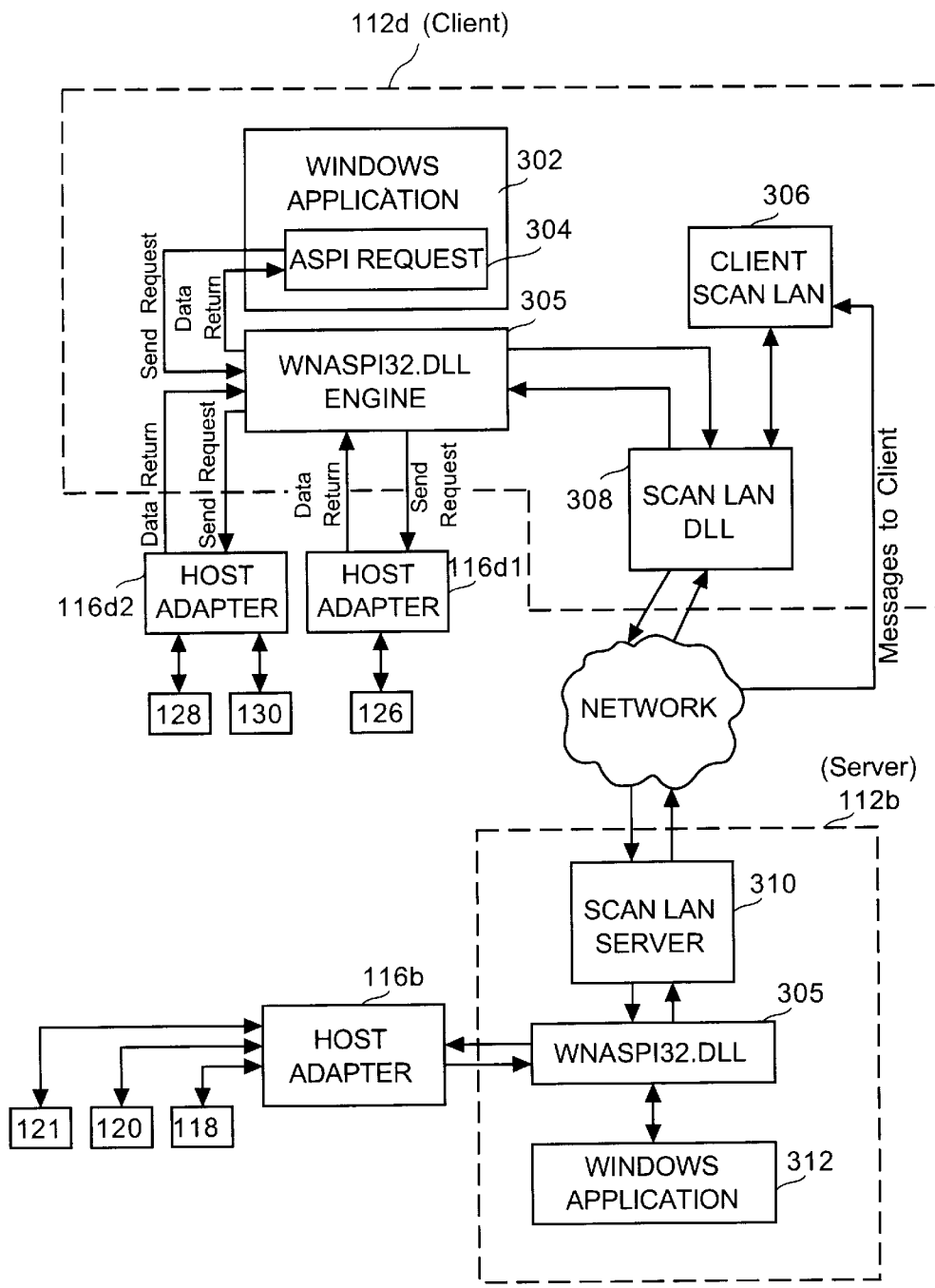
FIG. 3A shows a block diagram that illustrates the functions implemented by a ScanLAN application in accordance with one embodiment of the present invention.

FIG. 3A shows a block diagram that describes the functions implemented by the ScanLAN application for communicating between computers having the Client ScanLAN program and computers having the server ScanLAN program in accordance with one embodiment of the present invention. As shown, computer 112d has several software components for communicating with selected host adapters that are connected to the local computer 112d. In operation, the computer 112d uses a Windows application to initiate and send advanced SCSI programming interface (ASPI) requests. In this manner, a Windows application 302 can use an ASPI request 304 to initiate a request to use a peripheral device that is connected to a local host adapter.

By way of example, if the Windows application 302 desires to use a local host adapter 116d2 to access a hard drive 128, the ASPI request 304 will send the request to a WNASPI32.DLL engine 305. Once the WNASPI32.DLL engine 305 receives the request from the ASPI request 304, the WNASPI32.DLL engine 305 will send the request to the host adapter 116d2, which in turn communicates with the desired peripheral device. On the other hand, if the request sent from the ASPI request 304 was directed at host adapter 116d1, the WNASPI32.DLL engine 305 would alternatively send the request to the host adapter 116d 1.

At this point, the contacted host adapter can communicate with the desired peripheral device, perform the requested processing, and return any data back to the WNASPI32.DLL engine 305. The returned data will then be sent back to the ASPI request 304, which communicates it to the Windows application 302. More specifically, if the Windows application 302 desires to read a file that is stored on a tape drive 130 (that is connected to the host adapter 116d2), that file would then be read and sent back as returned data to the WNASPI32.DLL engine 305. Then, that returned data will be sent back to the requesting Windows application 302.

In cases where the Windows application 302 desires to read or send data to one of the peripheral devices connected to a remote computer such as computer 112b, the WNASPI32.DLL engine 305 will then route that request to a ScanLAN DLL 308. By way of example, when the Windows application 302 desires to read image data from a scanner 118 that is connected to the host adapter 116b, the ASPI request 304 will first be sent to the WNASPI32.DLL engine 305. Because the Client ScanLAN application 306 was previously loaded onto the computer 112b (and is running in the background transparently), the WNASPI32.DLL engine 305 will know to first send the ASPI request to the ScanLAN DLL 308. As will be described in greater detail below, when the Client ScanLAN application is loaded onto a given computer, the WNASPI32.DLL will preferably route all requests (i.e., requests for local and remote peripheral devices) to the ScanLAN DLL 308. Thus, when the request is for a local peripheral device (i.e., a device that is connected to the requesting client computer), the request will be routed back to the WNASPI32.DLL engine 305 for processing.

Once the request is routed to the ScanLAN DLL 308, that request is sent over the network to the desired computer 112b that has access to the desired peripheral device 118. Therefore, the ASPI request is received by the network (i.e., any network computer, server, router, hub, or the like) and provided to a Server ScanLAN application 310 that is loaded on the computer 112b. As mentioned above, any computer that desires to share its peripheral devices with other networked computers must have the Server ScanLAN application loaded thereon. The Server ScanLAN application 310 will then provide the request to the WNASPI32.DLL engine 305 (i.e., which is part of computer 112b) for processing. At that point, the WNASPI32.DLL engine 305 will pass the request to the host adapter 116b for processing.

Because the host adapter 116b has access to the scanner peripheral device 118, that host adapter will communicate the scanned data back to the WNASPI32.DLL engine 305 of computer 112d. The scanned data will then be transferred back to the ScanLAN server 310, over the network, through the ScanLAN DLL 308, through the WNASPI32.DLL engine 305, and then back to the Windows application 302. However, if it is determined that the scanner peripheral device 118 is currently being used by either the computer 112b, or another computer having the Client ScanLAN software, the request from computer 112d is placed in a queue.

When the scanner peripheral device 118 becomes available, the ScanLAN server application 310 will communicate back through the network and send a message to the Client ScanLAN 306. In one embodiment, the message is designed to inform the user of the client computer 112d that the peripheral device is in use, and then subsequently inform the user that the device is available.

As mentioned above, the WNASPI32.DLL engine 305 is preferably well suited to know when the Client ScanLAN 306 application has been loaded onto a particular networked computer, which provides access to peripheral devices that are connected to computers over the network. To accomplish this, when the Client ScanLAN application 306 is loaded onto a particular computer, the behavior of the WNASPI32.DLL engine 305 is changed by modifying the computer system registry. In one embodiment, the system registry may be modified by providing a path to the Scan-LAN DLL 308.

For example, the WNASPI32.DLL engine 305 is configured to check the system registry at the following location "Hkey/local machine/software/Adaptec/ASPI" for a special entry entitled "attachment" (c:/ScanLAN/ScanLAN.DLL). At that special entry, the ScanLAN DLL 308 file is located. Accordingly, if this path is present in the system registry, then it will be known that the Client ScanLAN application was loaded onto the local computer. The functionality of the ScanLAN DLL will be described in greater detail below.

Accordingly, when the Windows application 302 desires to use a peripheral device that is connected to a remote computer over a network, the ScanLAN DLL 308 will be well suited to communicate to the desired computer having the Server ScanLAN application loaded thereon. However, in this embodiment, it is important to note that when the Client ScanLAN application 306 is loaded onto a particular computer, that computer will always first communicate to the ScanLAN DLL 308 before communicating to host adapters that are either local to that computer or remote to that computer. That is, once the Client ScanLAN program 306 is loaded onto a particular computer, the WNASPI32.DLL engine 305 is modified as described above, which requires that the WNASPI32.DLL engine 305 first communicate with the ScanLAN DLL 308.

Once at the ScanLAN DLL 308, it is determined whether communication is desired to a local host adapter such as host adapters 116d1 and 116d2, or a remote host adapter such as host adapter 116b. If communication is desired to a remote host adapter such as host adapter 116b, the ASPI request is sent over the network, to the desired computer (having the Server ScanLAN application) and then to the desired host adapter. On the other hand, if communication is desired to a local host adapter, the ScanLAN DLL will then pass back that request to the WNASPI32.DLL engine 305, which then transmits it to the desired local host adapter.

Figure 3B:
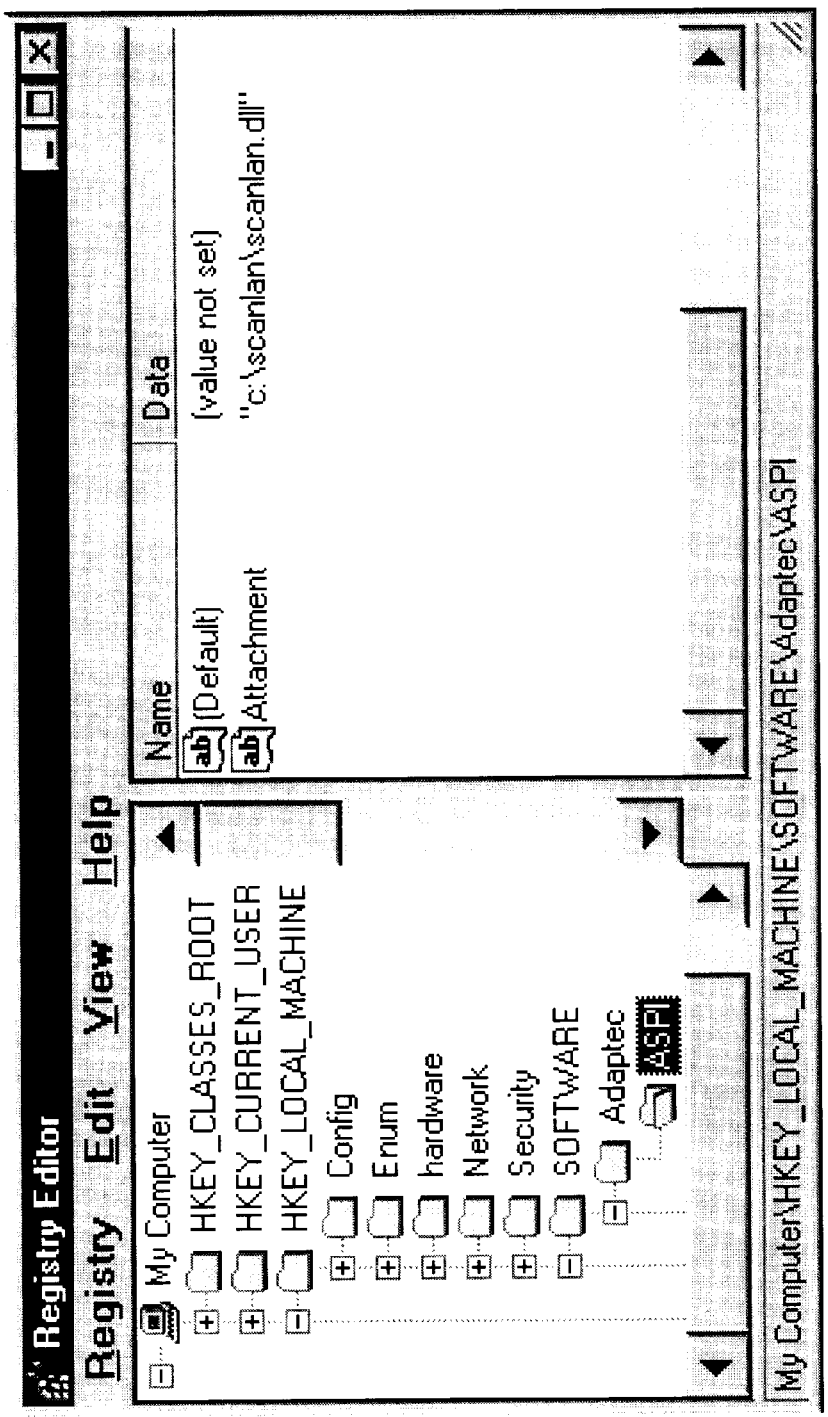
FIG. 3B shows an exemplary registry editor window which is used to modify communication to a ScanLAN DLL in accordance with one embodiment of the present invention.

FIG. 3B shows an exemplary registry editor window which is used to direct a path for the WNASPI32.DLL engine 305, so that it will first communicate with the ScanLAN DLL 308 in accordance with one embodiment of the present invention. As mentioned above, the WNASPI32.DLL engine 305 will communicate first with the ScanLAN DLL 308 only when the Client ScanLAN 306 has been loaded onto the computer which is desiring access to a remote peripheral device. Of course, any other suitable method for directing the WNASPI32.DLL engine 305 to first look to the ScanLAN DLL 308 will also work.

Figure 4:
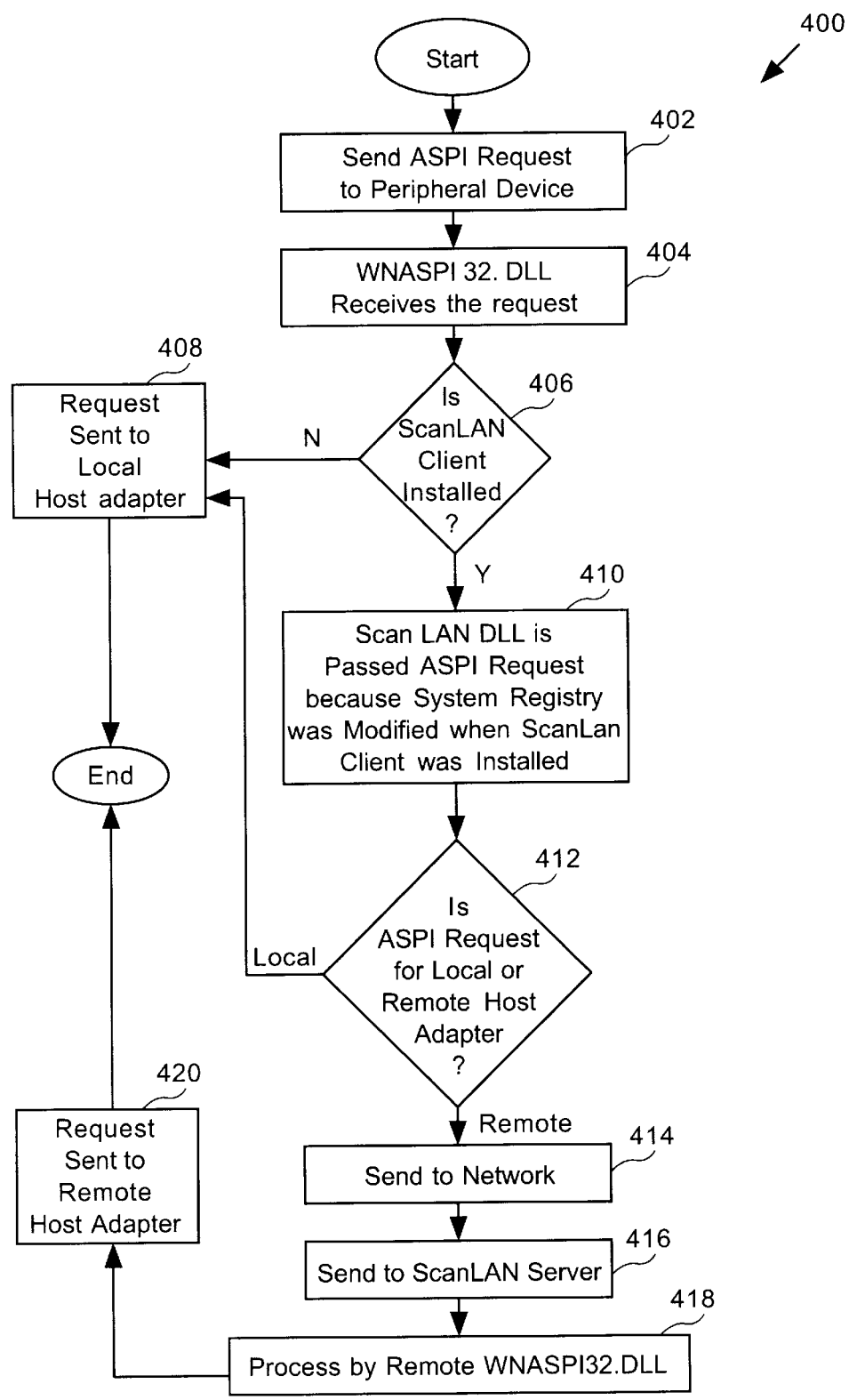
FIG. 4 shows a flowchart diagram of the method operations executed by the ScanLAN software to perform communication with local peripheral devices and remote peripheral devices that are networked together in accordance with one embodiment of the present invention.

FIG. 4 shows a flowchart diagram 400 of the method operations used by the ScanLAN software to perform communication with local peripheral devices and remote peripheral devices that are networked together in accordance with one embodiment of the present invention. The method begins at an operation 402 where an ASPI request is sent to a peripheral device. As described above, the peripheral device may be either connected to the local computer, or be connected to a computer that is remote, but networked to the local computer.

Next, the method will proceed to an operation 404 where a WNASPI32.DLL engine 305 receives the ASPI request. Once the WNASPI32.DLL engine 305 receives the ASPI request, the method proceeds to a decision operation 406 where it is determined if a ScanLAN client has been installed on the computer that is making the ASPI request. If no ScanLAN client has been installed on this local computer, the method will proceed to an operation 408. In operation 408, the request is sent to the local host adapter and the method will end.

On the other hand, if the Client ScanLAN was installed onto the local computer, the method will proceed from decision operation 406 to operation 410. In operation 410, the ScanLAN DLL is passed the ASPI request because the system registry was modified when the ScanLAN client was installed. As mentioned above, the system registry is modified so that the WNASPI32.DLL engine 305 of FIG. 3 will initially communicate with the ScanLAN DLL 308 before either communicating with a remote host adapter or a local host adapter. Once the ScanLAN DLL 308 has been passed the ASPI request, the method will proceed to a decision operation 412.

In decision operation 412, it is determined whether the ASPI request is for a local or a remote host adapter. If the request is for a local host adapter, the method will proceed to a decision operation 408 as described above. That is, the ASPI request will be routed from the ScanLAN DLL 308 back to the WNASPI32.DLL engine 305 which then communicates to a local host adapter. On the other hand, if it is determined that the ASPI request is for a remote host adapter, the method will proceed to an operation 414. In operation 414, the ASPI request is sent to the network that is connected to other computers that are running the Server ScanLAN application.

Next, the ASPI request is sent to a Server ScanLAN computer that has the desired host adapter connected thereto. When the ScanLAN server of that remote computer receives the ASPI request, the ASPI request is sent to the WNASPI32.DLL engine 305 of that computer so that it may be processed and sent to a desired host adapter. Accordingly, the WNASPI32.DLL engine 305 will send the ASPI request to the remote host adapter in operation 420 and then the method will end.

Figure 5A:
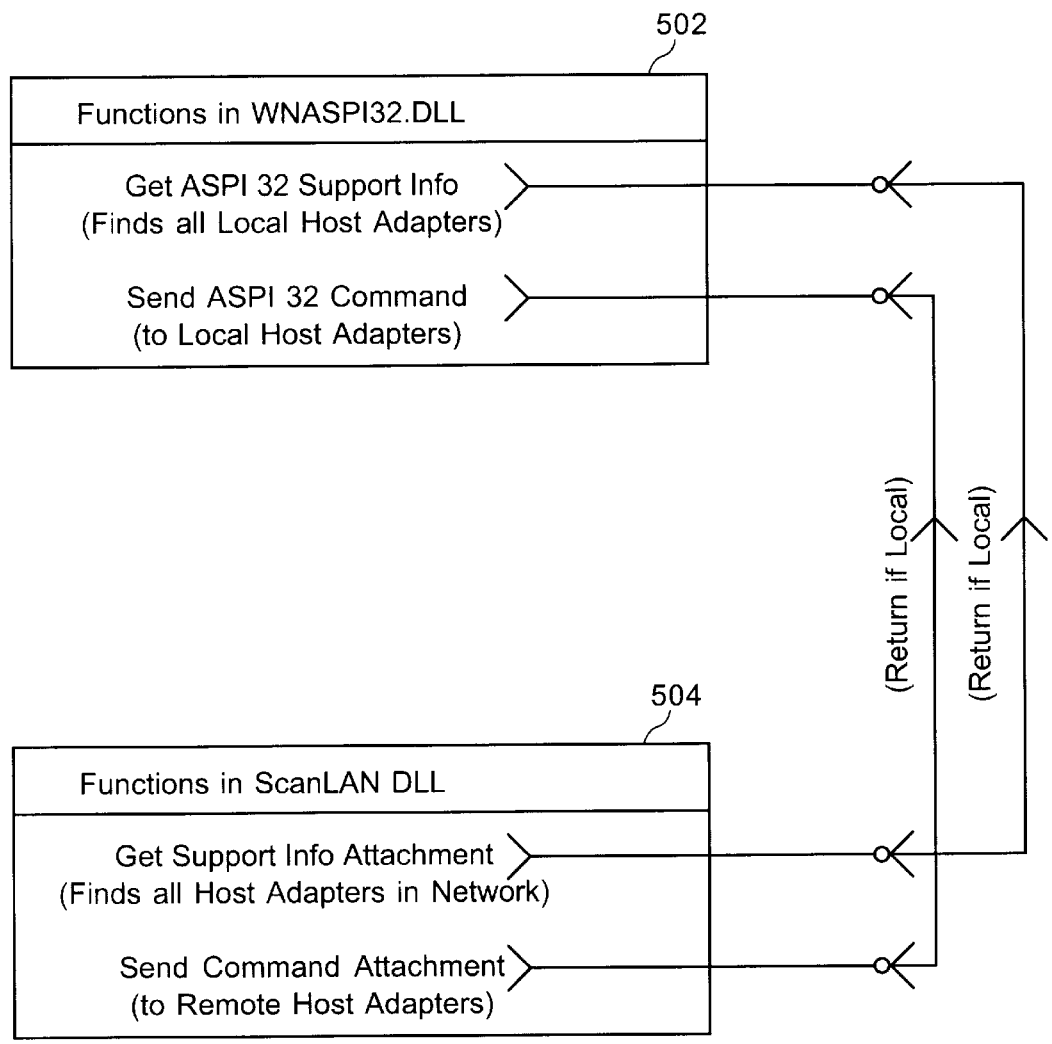
FIG. 5A shows functional block diagrams which are used to perform the communication between a modified WNASPI32.DLL engine and a ScanLAN DLL in accordance with one embodiment of the present invention.

FIG. 5A shows functional block diagrams which are used to execute the communication between a modified WNASPI32.DLL engine 305 and the ScanLAN DLL 308 in accordance with one embodiment of the present invention. Although there are other functions performed by the WNASPI32.DLL engine 305, the two main functions 502 used in communicating to a remote peripheral device include a "get ASPI 32 support info" function, and a "send ASPI 32 command" function. In general, the "get ASPI 32 support info" function is used to find all local host adapters in which the WNASPI32.DLL engine 305 is executed.

The "send ASPI 32 command" function is used to send ASPI commands to host adapters for communicating with those peripheral devices that are connected to those host adapters. By way of example, the ASPI commands may include any SCSI command that is used to communicate with a SCSI peripheral device that is connected to a local host adapter. In accordance with this embodiment, the ScanLAN DLL 308 also has two primary functions 504, which are used for communicating with the remote host adapters, or returning a command to a local WNASPI32.DLL engine 305 when the request is for a local host adapter.

As shown, a first function includes a "get support info attachment" function 504a, and a "send command attachment" function 504b. The "get support info attachment" function 504a is used to find all host adapters that are connected to a particular network. Accordingly, if a network includes "N" number of computers, the "get support info attachment" function 504a will be well suited to scan for those host adapters that are connect to the N computers. The "send command attachment" function 504b is used for sending SCSI commands to those desired remote host adapters.

As described above, when the WNASPI32.DLL engine 305 receives an ASPI request 304, that request is first sent to the ScanLAN DLL 308 if the Client ScanLAN application is loaded on that local computer. Once at the ScanLAN DLL 308, the "get support info attachment" function 504a determines the location of all host adapters in the network. If the host adapter that is desired is a local host adapter, the ASPI request is re-routed and returned back to the WNASPI32.DLL engine 305. At that point, the WNASPI32.DLL engine 305 will communicate that request to the local host adapter. On the other hand, if the desired host adapter is a remote host adapter, the send command attachment function 504b is used to send SCSI commands to those host adapters that are connected to a remote computer.

Figure 5B:
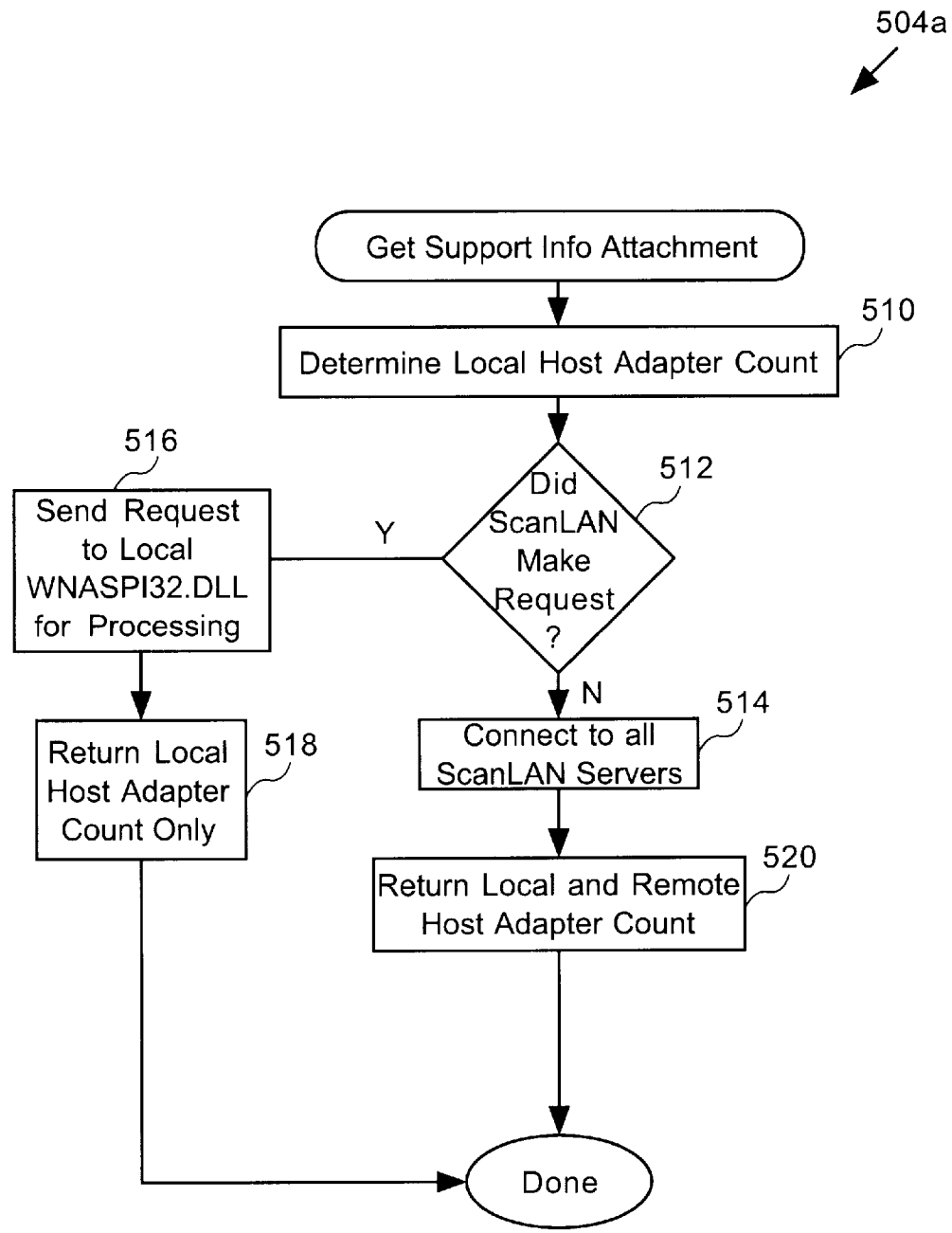
FIG. 5B shows a detailed flowchart diagram of the method operations used when a "get support info attachment" function is executed in accordance with one embodiment of the present invention.

FIG. 5B shows a detailed flowchart diagram of the method operations used when the "get support info attachment" function 504a is executed in accordance with one embodiment of the present invention. The method begins at an operation 510 where the local host adapter count is first determined. For example, if the local computer has three host adapters, the count will include all three host adapters. Next, the method will proceed to a decision operation 512 where it is determined if the ScanLAN server made the ASPI request.

If the ScanLAN server did make the ASPI request, the method will proceed to an operation 516. In operation 516, the ASPI request is sent to the local WNASPI32.DLL engine 305 for processing. The method will then proceed to an operation 518 where the local host adapter count determined in operation 510 is returned, and the method will end. On the other hand, if it is determined in operation 512 that the ScanLAN server did not make the ASPI request, the method will proceed to an operation 514. In operation 514, the method will proceed to connect to all ScanLAN servers that are connected to a network.

As mentioned above, any one of the computers that is connected to a particular network may function as a ScanLAN server, and may therefore share its individual peripheral devices with any computer that has the Client ScanLAN application loaded thereon. Once connection is complete to all ScanLAN servers in operation 514, the method will proceed to an operation 520. In operation 520, the local and the remote host adapter count will be returned and the method will end.

Figure 5C:
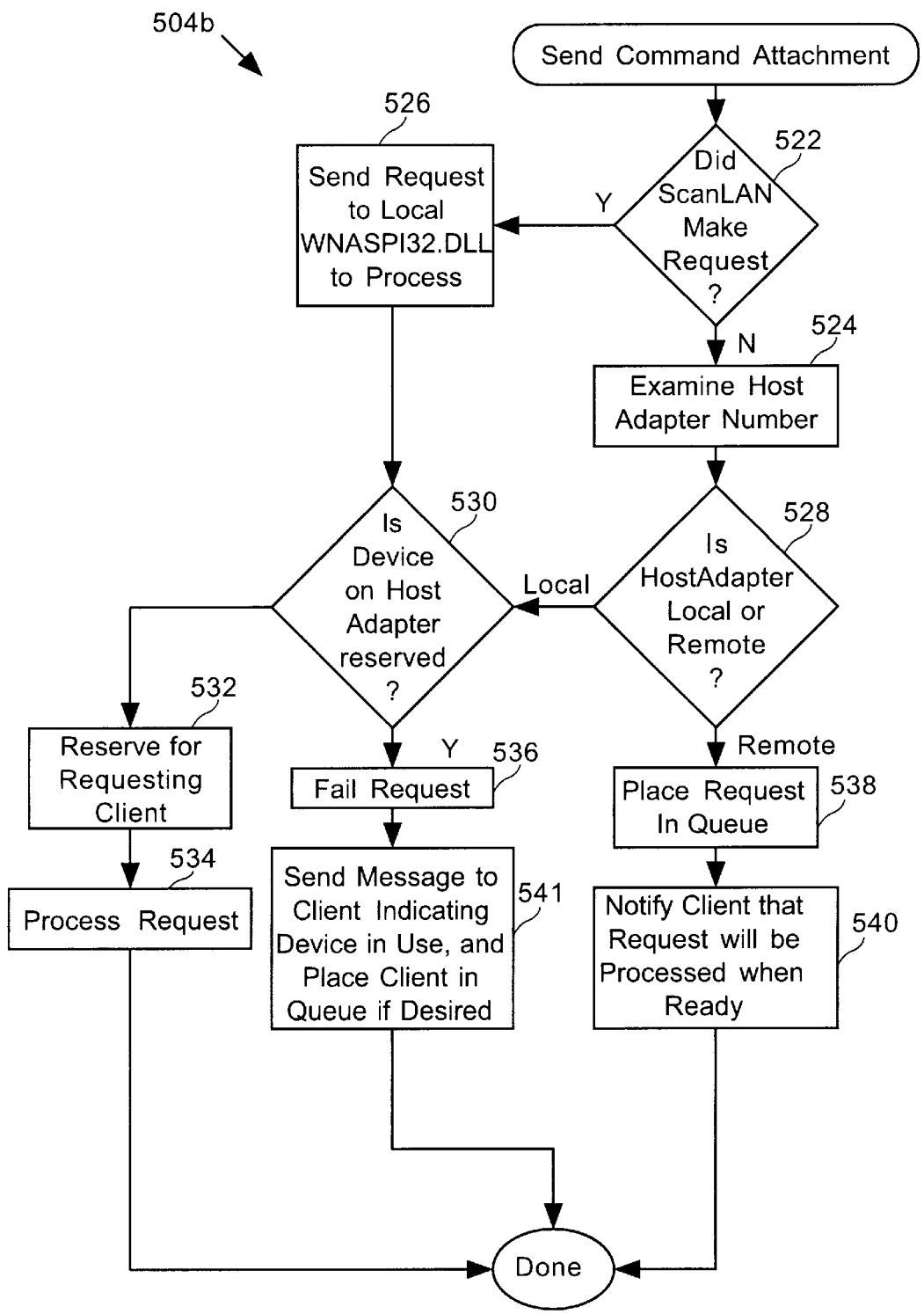
FIG. 5C shows a flowchart diagram illustrating the method operations performed in executing a "send command attachment" function of FIG. 5A in accordance with one embodiment of the present invention.

FIG. 5C shows a flowchart diagram illustrating the method operations performed in executing the send command attachment function 504b of FIG. 5A in accordance with one embodiment of the present invention. The method begins at an operation 522 where it is determined whether the ScanLAN server made the ASPI request. If it is determined that the ScanLAN server did make the ASPI request, the method will proceed to an operation 526 where the request is sent to the WNASPI32.DLL engine 305 of the local computer.

On the other hand, if it is determined in operation 522 that the ScanLAN server did not make the ASPI request, the method will proceed to an operation 524. In operation 524, the requested host adapter number is examined. Once the host adapter number has been examined, the method proceeds to a decision operation 528. In decision operation 528, it is determined if the host adapter is a local host adapter or a remote host adapter. If the host adapter is determined to be the local host adapter, the method will proceed to a decision operation 530.

In decision operation 530, it is determined if the device on the host adapter has been reserved by either another Client, or the local computer (which is acting as a Server). As shown, decision operation 530 is also processed after operation 526. At this point, if the device on the desired host adapter is reserved, the method will proceed to an operation 536 where the request may be failed. When the request is failed, the method will proceed to an operation 541 where a message is sent to the client indicating that the device is in use, and the requesting client will be placed in a queue if desired. At that point, the method will end.

Alternatively, if it is determined in operation 530 that the device on the host adapter is not reserved, the method will proceed to an operation 532 where the requested device is reserved for the requesting Client. Next, the method will proceed to an operation 534 where the request is processed, and the method will end. Referring back to decision operation 528, if it is determined that the requested host adapter is a remote host adapter, the method will proceed to a decision operation 538. In decision operation 538, the request is placed in a queue. The method operations performed when the request is placed in a queue 538 will be described in greater detail below with reference to FIG. 5D. From operation 538, the method will proceed to an operation 540 where the Client is notified that the request will be processed when ready, and the method will end.

Figure 5D:
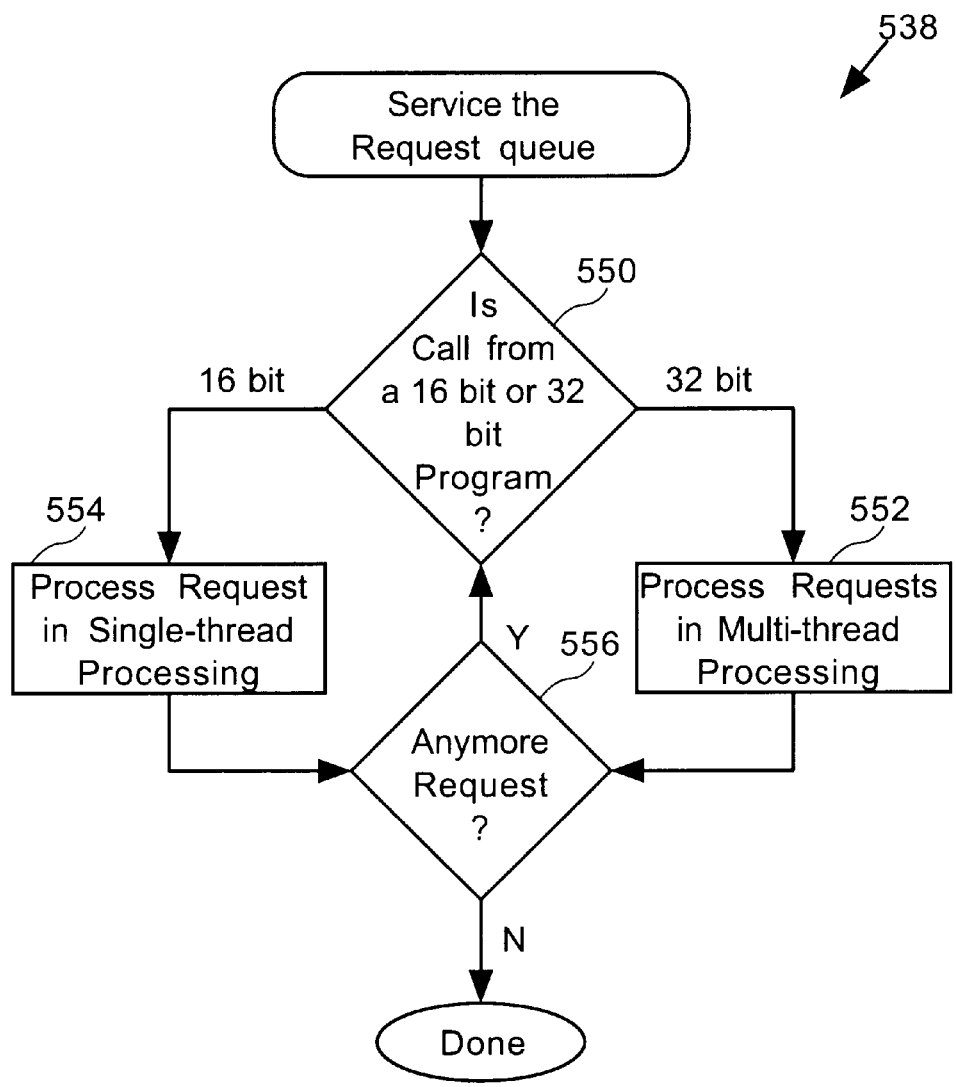
FIG. 5D shows the method operations performed when a request is placed in a queue as described in FIG. 5C in accordance with one embodiment of the present invention.

FIG. 5D shows the method operations performed when the request is placed in a queue as described in operation 538 of FIG. 5C in accordance with one embodiment of the present invention. The method begins at a decision operation 550 where it is determined if a function call is from a 16-bit or a 32-bit program. If it is determined that the function call is from a 16-bit program, the method will proceed to an operation 554 where the request is executed in single-thread processing. On the other hand, if it is determined that the function call is from a 32-bit program in operation 550, the method will proceed to an operation 552.

In operation 552, the request is executed in a multi-thread processing format. In one embodiment, between about 3 and 5 threads may be processed simultaneously to speed up any request that may be passed from a 32-bit program. From operations 554 and 552, the method will proceed to a decision operation 556. In decision operation 556, it is determined whether any more requests have been received. If more requests have been received, the method will again proceed to decision operation 550 for those received requests. On the other hand, if no other requests have been received, the method of placing the request in a queue will be done.

Advantageously, the only knowledge that a user operating the Client ScanLAN has of the existence of the Client ScanLAN application is a small icon that is displayed in the task bar of a Windows (i.e., 95, 98, etc.) or Windows NT (i.e., 3.5.1, 4.0, 5.0, etc.) platform. This is particularly user friendly because the use of a Client ScanLAN application will be transparent to the user, and its use does not require additional hardware nor special peripheral devices. Of course, the Client can only share those peripheral devices for which sharing privileges are allowed via the Server ScanLAN application.

In one embodiment of the present invention, the ScanLAN application is well suited to operate on a Windows platform. By way of example, in the Windows 95/98 platform, IPX, NetBEUI, and TCP/IP network protocols are supported, and in the Windows NT Platform, IPX, NetBEUI, TCP/IP and Named Pipes network protocols are supported. In this manner, the above described Microsoft RPC (Remote Procedure Call) and ASPI for Win32 will operate in a good interfacing manner. For more information on the ASPI for Win32 (WNASPI32.DLL), reference can be made to the WNASPI32.DLL documentation that is available from Adaptec, Inc. of Milpitas, Calif. This document is hereby incorporated by reference in its entirety. Of course, suitable modifications may be performed so that the ScanLAN application can function on other operating systems, such as a UNIX operating system, an Apple Computer, Inc. operating system or the like.

The invention may employ various computer-implemented operations involving data stored in computer systems to drive computer peripheral devices (i.e., in the form of software drivers and programs). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 6:
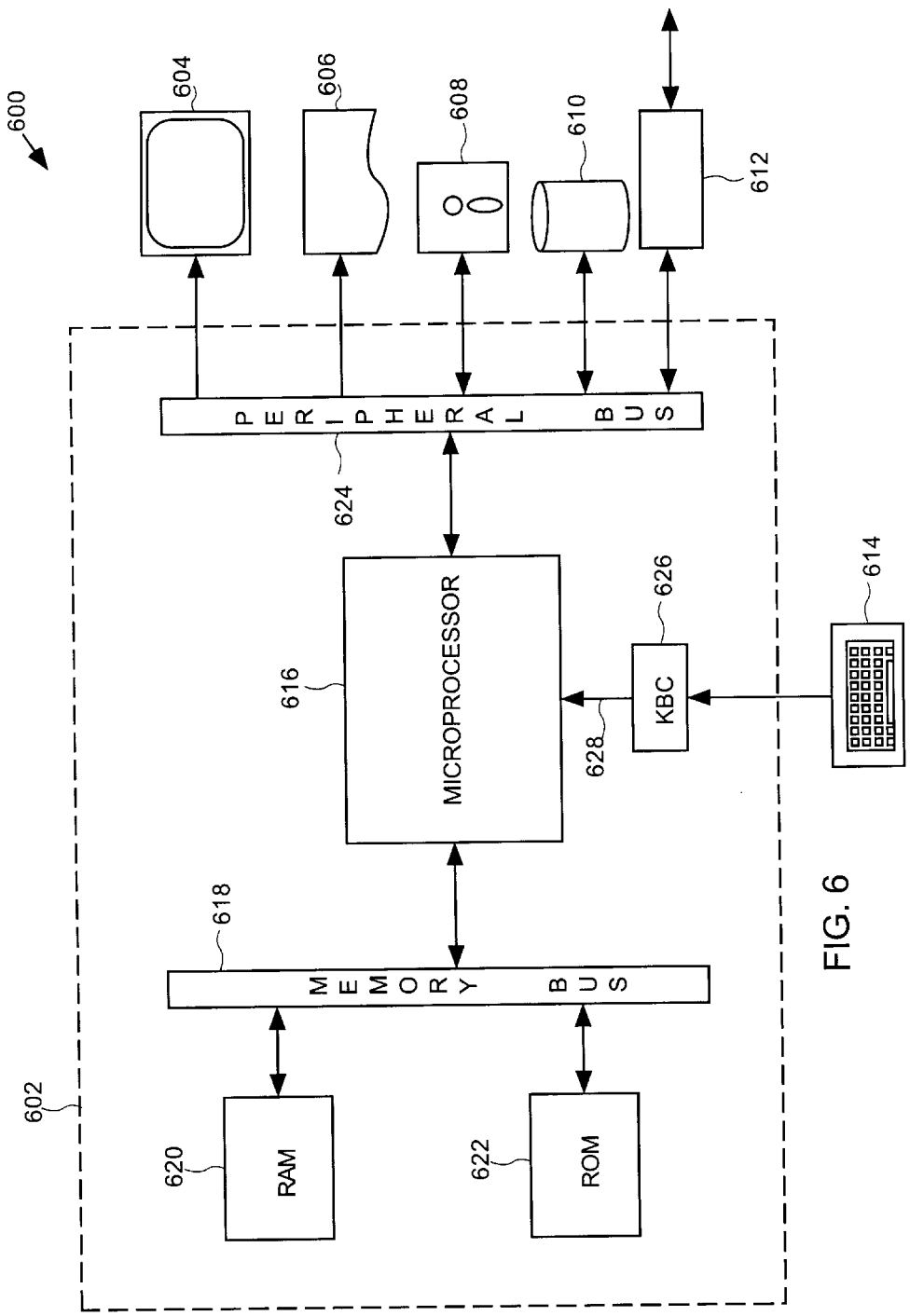
FIG. 6 is a block diagram of an exemplary computer system for carrying out the processing according to the invention.

FIG. 6 is a block diagram of an exemplary computer system 600 for carrying out the processing according to the invention. The computer system 600 includes a digital computer 602, a display screen (or monitor) 604, a printer 606, a floppy disk drive 608, a hard disk drive 610, a network interface 612, and a keyboard 614. The digital computer 602 includes a microprocessor 616, a memory bus 618, random access memory (RAM) 620, read only memory (ROM) 622, a peripheral bus 624, and a keyboard controller 626. The digital computer 600 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 616 is a general purpose digital processor which controls the operation of the computer system 600. The microprocessor 616 can be a single-chip processor or can be implemented with multiple components.

Using instructions retrieved from memory, the microprocessor 616 controls the reception and manipulation of input data and the output and display of data on output devices. According to the invention, a particular function of microprocessor 616 is to assist in the transparent sharing of peripheral devices over a network.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the printer device 606, the floppy disk drive 608, the hard disk drive 610, and the network interface 612. The keyboard controller 626 is used to receive input from keyboard 614 and send decoded symbols for each pressed key to microprocessor 616 over bus 628.

The display screen 604 is an output device that displays images of data provided by the microprocessor 616 via the peripheral bus 624 or provided by other components in the computer system 600. The printer device 606 when operating as a printer provides an image on a sheet of paper or a similar surface. Other output devices such as a plotter, typesetter, etc. can be used in place of, or in addition to, the printer device 606.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 610. The computer code and data could also reside on a removable program medium and loaded or installed onto the computer system 600 when needed. Removable program mediums include, for example, CD-ROM, PC-CARD, floppy disk and magnetic tape.

The network interface 612 is used to send and receive data over a network connected to other computer systems. An interface card or similar device and appropriate software implemented by the microprocessor 616 can be used to connect the computer system 600 to an existing network and transfer data according to standard protocols.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for establishing communication to a remote peripheral device over a network, comprising:

issuing a request to use a peripheral device to a remote communications dynamically linked list;

determining whether the peripheral device is a local peripheral device or a remote peripheral device; and sending the request over a network to a remote computer that has a server application when the peripheral device is the remote peripheral device, the server application being configured to enable sharing of peripheral devices that are connected to the remote computer.

2. A method for establishing communication to a remote peripheral device over a network as recited in claim 1, further comprising:

altering a system registry of a local computer that is making the request, so that the request is first sent to the remote communications dynamically linked list before the determining of whether the peripheral device is the local peripheral device that is connected to the local computer or the remote peripheral device that is connected to the remote computer.

3. A method for establishing communication to a remote peripheral device over a network as recited in claim 2, wherein the local computer uses a local dynamically linked list to send requests to the local peripheral device.

4. A method for establishing communication to a remote peripheral device over a network as recited in claim 3, wherein the altering of the system registry of the local computer that is making the request is performed when a client application is loaded onto the local computer.

5. A method for establishing communication to a remote peripheral device over a network as recited in claim 4, wherein the client application enables communication to the server application of the remote computer.

6. A method for establishing communication to a remote peripheral device over a network as recited in claim 2, wherein the request is an advanced SCSI programming interface.

7. A method for establishing communication to a remote peripheral device over a network as recited in claim 6, wherein the request is initiated by an application that is running on the local computer.

8. A method for establishing communication to a remote peripheral device over a network as recited in claim 7, further comprising:

determining if a call is from a 32-bit program or a 16-bit program.

9. A method for establishing communication to a remote peripheral device over a network as recited in claim 8, wherein when the call is from the 32-bit program, the request is executed in a multi-thread format.

10. A method for establishing communication to a remote peripheral device over a network as recited in claim 9, wherein when the call is from the 16-bit program, the request is executed in a single-thread format.

11. A apparatus for communicating with remote peripheral devices that are networked to a local computer, comprising:

a system registry having a modified path;

a local communication dynamic linked list that is configured to initially communicate with a remote communication dynamic linked list when the system registry has the modified path, the remote communication dynamic linked list communicating with a remote host adapter when a request is for a remote peripheral device, and the remote communication dynamic linked list communicating back to the local communication dynamic linked list for communication with a local host adapter when the request is for a local peripheral device.

12. A apparatus for communicating with remote peripheral devices that are networked to a local computer as recited in claim 11, wherein the request is an advanced SCSI programming interface request.

13. A apparatus for communicating with remote peripheral devices that are networked to a local computer as recited in claim 12, wherein the local communication dynamic linked list is a WNASPI32.DLL.

14. A apparatus for communicating with remote peripheral devices that are networked to a local computer as recited in claim 12, wherein the remote communication dynamic linked list is a ScanLAN DLL.

15. A apparatus for communicating with remote peripheral devices that are networked to a local computer as recited in claim 13, wherein the WNASPI32.DLL further comprises:

a first function for finding the local host adapter; and a second function for communicating SCSI commands to the local host adapter.

16. A apparatus for communicating with remote peripheral devices that are networked to a local computer as recited in claim 14, wherein the ScanLAN DLL further comprises:

a first function for finding the remote host adapter; and a second function for communicating SCSI commands to the remote host adapter.

17. A apparatus for communicating with remote peripheral devices that are networked to a local computer as recited in claim 11, wherein the remote peripheral device and the local peripheral device are SCSI devices.

18. A apparatus for communicating with remote peripheral devices that are networked to a local computer as recited in claim 11, wherein the remote peripheral device is a SCSI scanner.

19. A system for establishing communication to a remote peripheral device over a network, comprising:

means for issuing a request to use a peripheral device to a remote communications dynamically linked list;

means for determining whether the peripheral device is a local peripheral device or a remote peripheral device; and means for sending the request over a network to a remote computer that has a server application when the peripheral device is the remote peripheral device, the server application being configured to enable sharing of peripheral devices that are connected to the remote computer.

20. A system for establishing communication to a remote peripheral device over a network as recited in claim 19, further comprising:

means for altering a system registry of a local computer that is making the request, so that the request is first sent to the remote communications dynamically linked list before the determining of whether the peripheral device is the local peripheral device that is connected to the local computer or the remote peripheral device that is connected to the remote computer.

21. A system for establishing communication to a remote peripheral device over a network as recited in claim 20, wherein the local computer uses a local dynamically linked list to send requests to the local peripheral device.

22. A system for establishing communication to a remote peripheral device over a network as recited in claim 21, wherein the altering of the system registry of the local computer that is making the request is performed when a client application is loaded onto the local computer.

23. A system for establishing communication to a remote peripheral device over a network as recited in claim 22, wherein the client application enables communication to server application of the remote computer.

24. A system for establishing communication to a remote peripheral device over a network as recited in claim 20, wherein the request is an advanced SCSI programming interface.

25. A method for establishing communication to peripheral device, comprising:

altering a system registry so that a local communication dynamic linked list initially communicates with a remote communication dynamic linked list;

issuing a request to use a peripheral device to the remote communication dynamic linked list;

if the request is for a remote peripheral device, communicating with a remote host adapter from the remote dynamic linked list; and if the request is for a local peripheral device, communicating back to the local dynamic linked list from the remote dynamic linked list for communication with a local host adapter.

26. A computer readable media containing program instructions for establishing communication to a remote peripheral device over a network, comprising:

program instructions for issuing a request to use a peripheral device to a remote communications dynamically linked list;

program instructions for determining whether the peripheral device is a local peripheral device or a remote peripheral device; and program instructions for sending the request over a network to a remote computer that has a server application when the peripheral device is the remote peripheral device, the server application being configured to enable sharing of peripheral devices that are connected to the remote computer.

* * * * *